(12) United States Patent
Ouellet et al.

(10) Patent No.: US 8,448,418 B2
(45) Date of Patent: May 28, 2013

(54) METHOD FOR CONTROLLING A FLOWRATE OF A RECIRCULATED EXHAUST GAS

(75) Inventors: Noemie Dion Ouellet, Greenville, SC (US); Jason D. Fuller, Simpsonville, SC (US); Joell R. Hibshman, II, Greer, SC (US)

(73) Assignee: General Electric Company, Schenectady, NY (US)

( * ) Notice: Subject to any disclaimer, the term of this patent is extended or adjusted under 35 U.S.C. 154(b) by 1299 days.

(21) Appl. No.: 12/046,074

(22) Filed: Mar. 11, 2008

(65) Prior Publication Data
US 2009/0229263 A1    Sep. 17, 2009

(51) Int. Cl.
*F02C 7/08* (2006.01)

(52) U.S. Cl.
USPC .......................................... 60/39.52; 60/39.5

(58) Field of Classification Search
USPC ..................... 60/39.52, 39.5, 39.24
See application file for complete search history.

(56) References Cited

U.S. PATENT DOCUMENTS

| | | | |
|---|---|---|---|
| 6,202,400 B1 * | 3/2001 | Utamura et al. | 60/773 |
| 6,895,752 B1 * | 5/2005 | Holtman et al. | 60/605.2 |
| 2007/0034171 A1 * | 2/2007 | Griffin et al. | 122/479.1 |
| 2007/0079614 A1 * | 4/2007 | Barbe et al. | 60/605.2 |

* cited by examiner

*Primary Examiner* — Phutthiwat Wongwian
*Assistant Examiner* — Vikansha Dwivedi
(74) *Attorney, Agent, or Firm* — Cantor Colburn LLP

(57) ABSTRACT

A method for controlling a turbomachine exhaust gas recirculation (EGR) system is provided. The EGR system may allow for the removal and sequestration of at least one constituent within the exhaust before the recirculation occurs.

14 Claims, 3 Drawing Sheets

METHOD FOR CONTROLLING A FLOWRATE OF A RECIRCULATED EXHAUST GAS

This application is related to commonly-assigned U.S. patent application Ser. No. 11/928,038, filed Oct. 30, 2007; U.S. patent application Ser. No. 11/953,524, filed Dec. 10, 2007; U.S. patent application Ser. No. 11/953,556, filed Dec. 10, 2007; and U.S. patent application Ser. No. 11/956,679, filed Dec. 14, 2007.

BACKGROUND OF THE INVENTION

The present invention relates to an exhaust gas recirculation system, and more particularly to a method and system for controlling the quantity of exhaust reentering a turbomachine after processing by a recirculation system.

The emissions from a turbomachine, such as a gas turbine, are closely regulated. There is a growing concern over the long-term effects of Nitrogen Oxides (hereinafter NOx), Carbon Dioxide (hereinafter "$CO_2$") and Sulfur Oxides (SOx) emissions on the environment. Operators of turbomachines desire methods of reducing the levels of NOx, $CO_2$, and SOx emitted.

Significant amounts of condensable vapors exist in the exhaust gas stream. These vapors usually contain a variety of constituents such as water, acids, aldehydes, hydrocarbons, sulfur oxides, and chlorine compounds. Left untreated, these constituents will accelerate corrosion and fouling of the internal components if allowed to enter the turbomachine.

Exhaust gas recirculation (EGR) generally involves recirculating a portion of the emitted exhaust through an inlet portion of the turbomachine. The exhaust is then mixed with the incoming airflow prior to combustion. The EGR process facilitates the removal and sequestration of concentrated $CO_2$, and may also reduce the NOx and SOx emission levels.

There are a few concerns about the currently known EGR systems. The rate and composition of the recirculated exhaust impacts the turbomachine operability including, but not limiting of: combustor stability, emissions, compressor stability, and component life.

For the foregoing reasons, there is a need for a method for controlling the composition of the inlet fluid exiting the EGR system. The method should control the rate of exhaust reentering the turbomachine using an open loop methodology.

BRIEF DESCRIPTION OF THE INVENTION

In accordance with an embodiment of the present invention, a method of controlling an exhaust stream; wherein the exhaust stream is generated by a turbomachine; the method comprising: providing at least one exhaust gas recirculation (EGR) system comprising: at least one EGR flow conditioning device and at least one flow control device; wherein the EGR system reduces the concentration of the at least one constituent within the exhaust stream; and utilizing an EGR control system for controlling the EGR system, wherein steps performed by the EGR control system comprise: receiving an EGR control reference; and determining a target EGR rate, wherein the target EGR rate controls at least one component of the EGR system.

In accordance with an alternate embodiment of the present invention, a method of controlling an exhaust stream, wherein the exhaust stream is generated by a turbomachine; the method comprising: providing at least one exhaust gas recirculation (EGR) system comprising: at least one EGR flow conditioning device and at least one flow control device; wherein the EGR system processes the exhaust stream; and utilizing an EGR control system for controlling the EGR system, wherein steps performed by the EGR control system comprise: receiving an EGR control reference; determining a target EGR rate, wherein the target EGR rate controls at least one component of the EGR system; and communicating the target EGR rate to an EGR flow control device, wherein the EGR flow control device adjusts the flow of the exhaust stream.

DETAILED DESCRIPTION OF THE INVENTION

The following detailed description of preferred embodiments refers to the accompanying drawings, which illustrate specific embodiments of the invention. Other embodiments having different structures and operations do not depart from the scope of the present invention.

Certain terminology is used herein for the convenience of the reader only and is not to be taken as a limitation on the scope of the invention. For example, words such as "upper," "lower," "left," "right," "front", "rear", "top", "bottom", "horizontal," "vertical," "upstream," "downstream," "fore", "aft", and the like: merely describe the configuration shown in the Figures. Indeed, the element or elements of an embodiment of the present invention may be oriented in any direction and the terminology, therefore, should be understood as encompassing such variations unless specified otherwise.

An EGR rate may be considered the rate at which a recirculated exhaust stream enters the turbomachine. In the present invention a target EGR rate may be used to control EGR flow conditioning devices. The target EGR rate may derive from an EGR control reference, or the like. The source of the EGR control reference may be, for example, but not limiting of, a turbine control system, a plant control system, generated from another source, or combinations thereof.

The composition of the inlet fluid includes, but is not limiting of, the exhaust stream, the inlet air, and at least one of the aforementioned constituents.

The present invention may be applied to the variety of turbomachines that produce a gaseous fluid, such as, but not limiting of, a heavy duty gas turbine; an aero-derivative gas turbine; or the like (hereinafter referred to as "gas turbine"). An embodiment of the present invention may be applied to either a single gas turbine or a plurality of gas turbines. An embodiment of the present invention may be applied to a gas turbine operating in a simple cycle or a combined cycle configuration.

Figure 1:
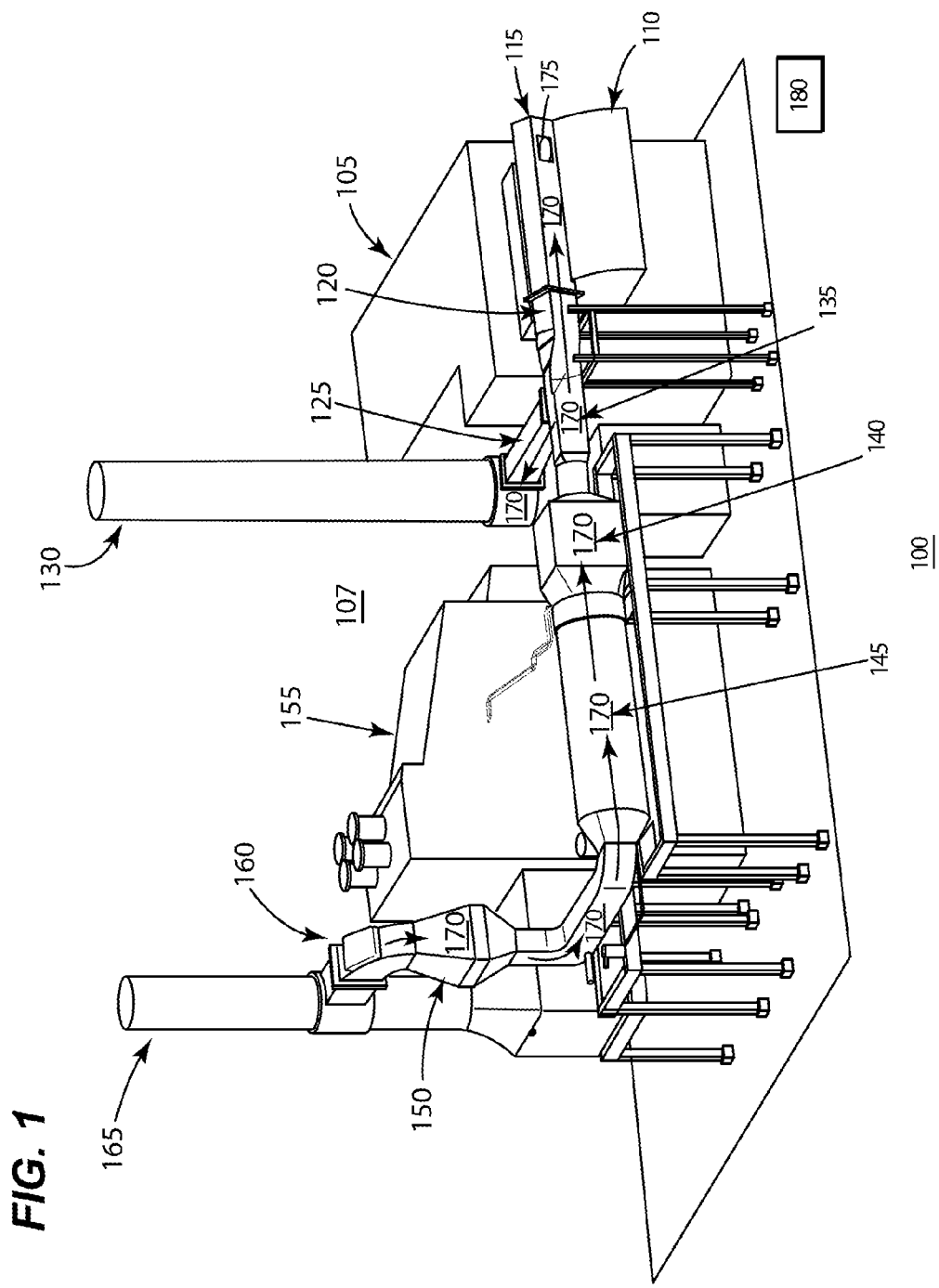
FIG. 1 is a schematic illustrating the environment in which an embodiment of the present invention operates.

Referring now to the Figures, where the various numbers represent like elements throughout the several views, FIG. 1 is a schematic illustrating the environment in which an embodiment of the present invention operates. FIG. 1 illustrates a site 100, such as but not limiting of a powerplant site, having a turbomachine 105, an EGR system 107, a heat recovery steam generator (HRSG) 155, and an exhaust stack 165. Alternatively, the present invention may be integrated with a site 100 not having the HRSG 155.

The EGR system 107 comprises multiple elements. The configuration and sequence of these elements may be dictated by the composition of the exhaust stream 170 and the type of cooling fluid used by the components of the EGR system 107. Furthermore, alternate embodiments of the EGR system 107 may include additional or fewer components than the components described below. Therefore, various arrangements, and/or configurations, which differ from FIG. 1, may be integrated with an embodiment of the present invention.

As illustrated in FIG. 1, the EGR system 107 comprises: a bypass stack 130; an EGR flow conditioning system 135; at least one EGR feedback device 175 and an EGR control system 180. The EGR flow conditioning system 135 may include, for example, but not limiting of at least one EGR flow control device 160; a mixing station 115; an inlet modulation device 120; a bypass modulation device 125; a downstream temperature conditioning device 140; at least one constituent reduction device 145 and an upstream temperature conditioning device 150.

An EGR flow control device 160 may be considered a prime mover or flow-restricting device that can adjust the flowrate of the exhaust stream 170. The at least one EGR flow control device 160 may include, for example, but not limiting of, a damper, a valve, a fan, a pump, or the like, and combinations thereof. The at least one constituent reduction device 145 may include, for example, but not limiting of, a drain, a scrubber, a heat exchanger or the like, and combinations thereof. The at least one EGR feedback device 175 may provide direct or indirect data on a position or state of at least one of the components of the EGR system 107.

Generally, the process used by the EGR system 107 may include: cooling of the exhaust stream 170; reduction and removal of the aforementioned constituents within the exhaust stream 170; and then mixing the exhaust stream 170 with the inlet air, forming an inlet fluid; which flows from the inlet section 110 through to the exhaust stack 165. The EGR system 107 may reduce the temperature of the exhaust stream 170 to a saturation temperature where the aforementioned constituents may condense and then be removed. Alternatively, the EGR system 107 may also reduce the temperature of, and use a scrubbing process (or the like) on, the exhaust stream 170 to remove the aforementioned constituents.

While EGR system 107 operates, the at least one EGR feedback device 175 may measure the flowrate of the exhaust stream 170, which may be used to determine the EGR fraction. The at least one EGR feedback device 175 may be located adjacent the inlet section 110 of the turbomachine 105. The at least one EGR feedback device 175 may be used to determine the concentration of at least one constituent within the inlet fluid.

As will be appreciated, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects all generally referred to herein as a "circuit", "module," or "system". Furthermore, the present invention may take the form of a computer program product on a computer-usable storage medium having computer-usable program code embodied in the medium.

Any suitable computer readable medium may be utilized. The computer-usable or computer-readable medium may be, for example but not limited to, an electronic, magnetic, optical, electro-magnetic, infrared, or semiconductor system, apparatus, device, or propagation medium. More specific examples (a non exhaustive list) of the computer-readable medium would include the following an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in an object oriented programming language such as Java7, Smalltalk or C++, or the like. However, the computer program code for carrying out operations of the present invention may also be written in conventional procedural programming languages, such as the "C" programming language, or a similar language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatuses (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a public purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions, which execute on the computer or other programmable, provide steps for implementing the functions/acts specified in the flowchart and/or block diagram block.

The present invention has the technical effect of controlling the operation of an EGR system. The present invention may be configured to automatically operate. Alternatively, the present invention may be configured to require a user action to the initiate operation. An embodiment of the EGR control system 180 of the present invention may function as a stand-alone system. Alternatively, the EGR control system 180 may be integrated as a module, or the like, within a broader system, such as a turbine control or a plant control system. For example, but not limiting of, the EGR control system 180 of the present invention may be integrated with the system operating the turbomachine 105.

Figure 2:
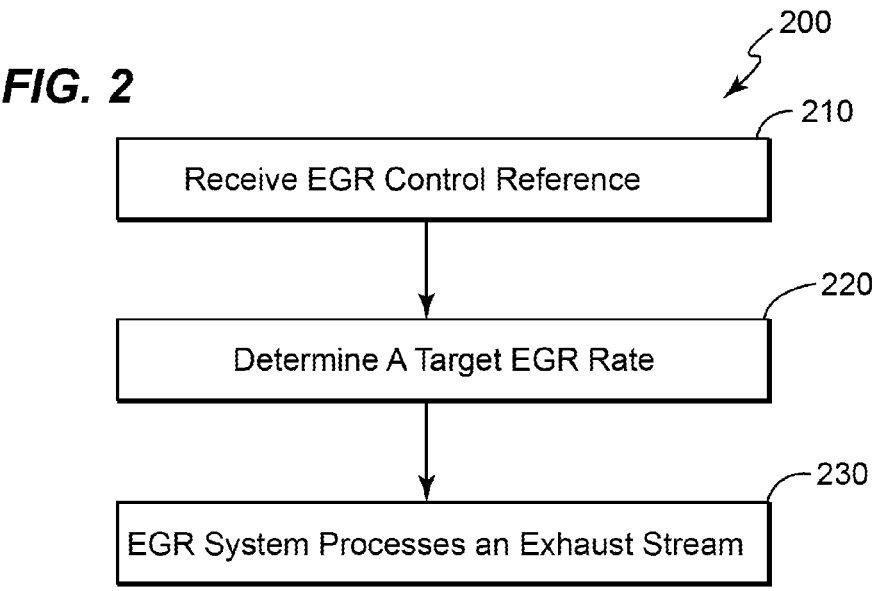
FIG. 2 is a flowchart illustrating an example of a method of controlling an EGR system in accordance with an embodiment of the present invention.

FIG. 2 is a flowchart illustrating an example of a method 200 of utilizing open loop control system to control an EGR system in accordance with an embodiment of the present invention. The method 200 may include at least one EGR constituent control system, which may function, for example, but not limiting of, in steps 210 to 230. In an embodiment of the present invention the EGR system 107 may be integrated with a graphical user interface (GUI), or the like. The GUI may allow the operator to navigate through the method 200 described below. The GUI may also provide at least one notification of the status of the EGR system 107.

In step 210, the method 200 may receive an EGR control reference, which generally relates to a flowrate of the exhaust stream 170. Alternatively, the EGR control reference may be analogous to an EGR fraction; which is considered the amount, such as, but not limiting of, a percentage of the exhaust stream 170 within the inlet fluid. As discussed below, the EGR control reference may be at least one of the following types: an EGR mass fraction; an EGR mole fraction; an EGR flow; a constituent concentration; a compressor inlet temperature; or combinations thereof.

In an embodiment of the present invention, the method 200 may automatically receive the EGR control reference from the turbomachine control system, plant control system, or other source. In an alternate embodiment of the present invention, a user may enter the EGR control reference. In another alternate embodiment of the present invention, the EGR control reference is generated by the EGR control system 180.

In step 220, the method 200 may determine a target EGR rate; which, as discussed, may be considered a flowrate at which the exhaust stream 170 enters the inlet section 110. An embodiment of the present invention may utilize the target EGR rate to control or determine the operation of at least one component of the EGR flow conditioning system 135. For example, but not limiting of, the target EGR rate may set a speed of a fan, blower, or other device operating within the EGR flow conditioning system 135.

The method 200 may determine the target EGR rate from an EGR control reference. An embodiment of the present invention allows for receiving various types of EGR control references. As discussed below, the type of EGR control reference may determine how the method 200 calculates (or the like) the target EGR rate.

The method 200 may receive the EGR control reference in the form of an EGR mass fraction or mole fraction. The EGR mass fraction or mole fraction may be considered the proportion of the exhaust stream 170 within the inlet fluid. Here, the method 200 may utilize a transfer function or the like, to convert the target EGR mass fraction or target EGR mole fraction to the target EGR rate. The transfer function may utilize the compressor airflow to determine the target EGR rate. For example, but not limiting of, the transfer function may multiply the EGR mass fraction by the compressor airflow to determine the target EGR rate.

Alternatively, the method 200 may also receive the EGR control reference in the form of a constituent concentration, such as, but not limiting of, a specific $CO_2$ concentration. Here, the method 200 may utilize a transfer function, or the like, to convert the target constituent concentration to the target EGR rate, as described below. The transfer function may incorporate at least one physical equation, or the like, to determine the target EGR rate, as described below. For example, but not limiting of, if the EGR control reference is exhaust $CO_2$ mole fraction. Here, the transfer function may include the following variables: a target EGR mass fraction, fuel flow, fuel composition, and turbomachine 105 inlet flow. Additionally, the combustion reaction for the turbomachine 105 that burns a hydrocarbon fuel in standard air may be described by Equation 1, using molar coefficients, as illustrated below:

$$C_\alpha H_\gamma + (a+e)(O2 + 3.76 N2) => bCO2 + cH2o + eO2 + (a+e)(3.76)N2 \quad \text{[Equation 1]}$$

Here, "fuel composition" is defined by the carbon and hydrogen subscripts, α and γ. The excess oxygen molar coefficient, e, may be calculated as a function of EGR mass fraction ($X_{EGR}$), compressor inlet mass flow ($W_C$) and fuel mass flow ($W_F$) as illustrated by Equation 2.

$$e = \frac{1}{4.76} \frac{W_C(1 - X_{EGR})}{W_F} \frac{MW_{fuel}}{MW_{air}} - (\alpha + \gamma/4) \quad \text{Equation 2}$$

The target exhaust $CO_2$ mole fraction ($y_{CO2\_target}$), on a dry basis, may be calculated from the reaction in Equation 1 according to Equation 3.

$$y_{CO2\_target} = \frac{\alpha}{\alpha + e + (\alpha + \gamma/4 + e)(3.76)} \quad \text{Equation 3}$$

Equations 1 through 3 may be adapted to determine the desired EGR mass fraction; then the target EGR rate may be determined from the EGR mass fraction as previously described. Equations 1 through 3 may also be adapted to perform similar calculations for constituents other than $CO_2$ for different working fluids or fuel types. As discussed, the constituent includes at least one of: $SOx$, $NOx$, $CO$, $CO_2$, $O_2$, water, chloride ions, acids, aldehydes, hydrocarbons, or combinations thereof.

The method 200 may also receive the EGR control reference in the form of an inlet fluid temperature, where the inlet fluid is a mixture of the inlet air and the exhaust stream 170. Here, the method 200 may utilize a transfer function, or the like, to determine the target EGR rate. In an embodiment of the present invention, at least one energy balance may be used to determine the target EGR fraction.

The energy balance is generally based on the Conservation of Energy, which generally states that the energy entering a system equals the energy exiting the same system. The energy balance of an embodiment of the present invention is illustrated in Equation 4, which may be solved for $W_{EGR}$ that may be used to determine the target EGR fraction.

$$W_{EGR} = \frac{W_{Tin}(C_{P\_Tin}(T_{Tin} - T_{ref}) - C_{P\_air}(T_{air} - T_{ref}))}{C_{P\_EGR}(T_{EGR} - T_{ref}) - C_{P\_air}(T_{air} - T_{ref})}$$ [Equation 4]

where:

$W_{EGR}$ is the EGR rate (flowrate of exhaust stream 170);

$T_{EGR}$ is the temperature of exhaust stream 170;

$C_{P\_EGR}$ is the specific heat at constant pressure of the exhaust stream 170;

$W_{Tin}$ is the total flowrate into the turbomachine inlet;

$T_{Tin}$ is the temperature of the turbomachine inlet flow;

$C_{P\_Tin}$ is the specific heat at constant pressure of the turbomachine inlet flow;

$T_{air}$ is the temperature of the ambient air;

$C_{P\_air}$ is the specific heat at constant pressure of the ambient air; and $T_{ref}$ is a reference temperature for calculating absolute enthalpy.

Alternatively, the method 200 may also receive the target EGR rate in a form not requiring the use of a transfer function, or the like. Here, for example, but not limiting of, the method 200 may allow the user to enter the target EGR rate; or the EGR control system 180 may receive the target EGR rate from another system.

Alternatively, the target EGR rate may also be a function of a lookup table, or the like, to determine (for example) EGR fan speed based on ambient conditions or machine parameters such as speed, load, fuel flow, etc.

In step 230, of the method 200, the EGR system 107 may be processing an exhaust stream 170, as described. Here, the method 200 may use a look-up table, or the like, to determine the operational setpoint of at least one component of the constituent reduction system 145.

An embodiment of the present invention may utilize the at least one EGR flow control device 160 in the EGR system 107 to adjust the EGR rate. For example, but not limiting of, the method 200 may incorporate at least one of the following functions: adjusting a state of an EGR flow control device 160, such as but not limiting of, an EGR fan speed; adjusting a pitch of at least one EGR fan blade, adjusting the position of at least one damper or combinations thereof.

In an embodiment of the present invention, the GUI may provide a notification to the user if the EGR rate should be adjusted. For example, but not limiting for a target EGR rate of 10, the look-up table may suggest to operate a fan, within the constituent reduction system 145, at a speed of 700 rpm.

Depending on either the type and/or operation of the turbomachine 105, the generated exhaust may have a flowrate of about 10,000 Lb/hr to about 50,000,000 Lb/hr and a temperature of about 100 Degrees Fahrenheit to about 1,100 Degrees Fahrenheit.

Figure 3:
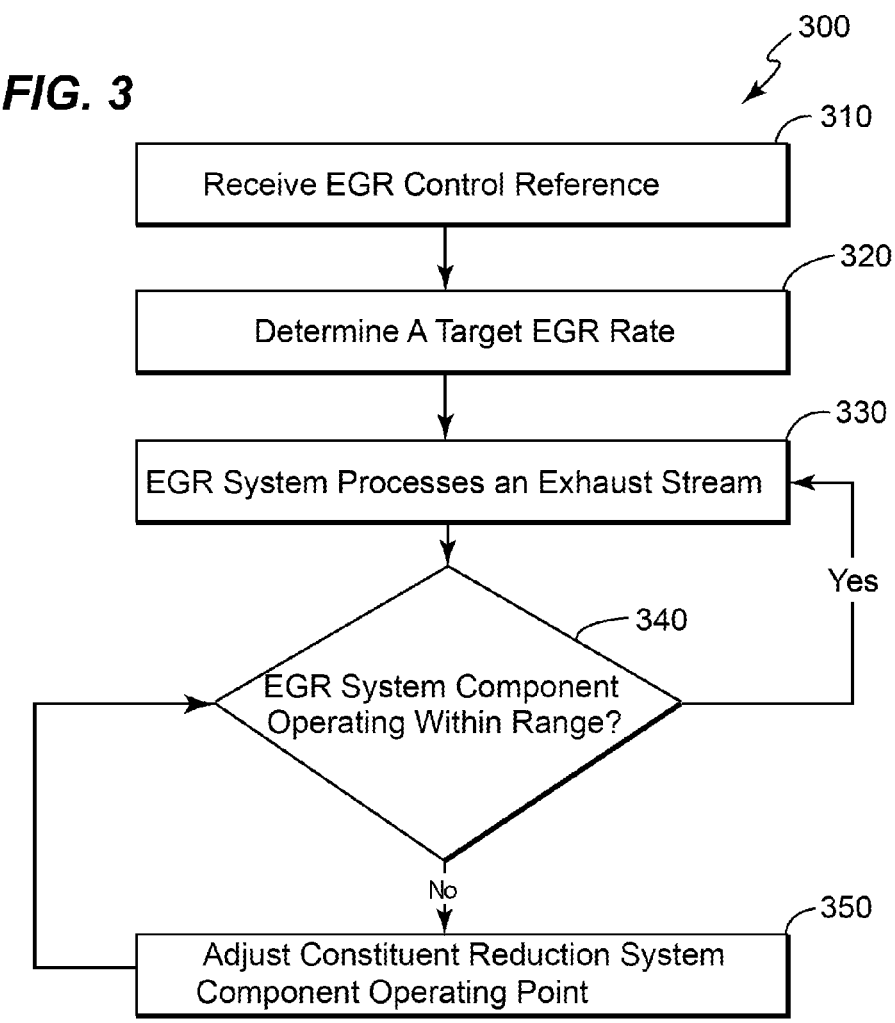
FIG. 3 is a flowchart illustrating an example of a method of controlling an EGR system in accordance with an alternate embodiment of the present invention.

FIG. 3 is a flowchart illustrating an example of a method 300 of utilizing a closed loop control system to control an EGR system in accordance with an alternate embodiment of the present invention. As illustrated, the primary difference between the embodiment illustrated in FIG. 2 and the embodiment illustrated in FIG. 3 is the feedback loop confirming the position of at least one EGR flow control device 160 controlling the EGR rate. Therefore, steps 310-330 are analogous to the discussion of steps 210-230 in FIG. 2.

In step 340, the method 300 may determine whether the EGR flow conditioning system 135 component(s) used to adjust the EGR rate operates within the target range. Here, the method 300 may monitor the operation of the EGR flow conditioning system 135 component(s). For example, but not limiting of, if the fan, within the EGR flow conditioning system 135, is set to operate at a target speed of 700 rpm, the method 300 determines whether the fan is operating within an acceptable range of 700 rpm. The method 300 may compare the actual fan speed with the target fan speed.

If the current operation of the EGR flow conditioning system 135 component is inside of the acceptable range then the method 300 may revert to step 330 where the method 300 may continue to process the exhaust stream 125. However, the method 300, in step 350), may adjust the component(s) of the EGR flow conditioning system 135 based on a difference between the requested setpoint and actual operating point. The adjustment will continue until the setpoint and feedback of the component(s) are within a certain tolerance.

Figure 4:
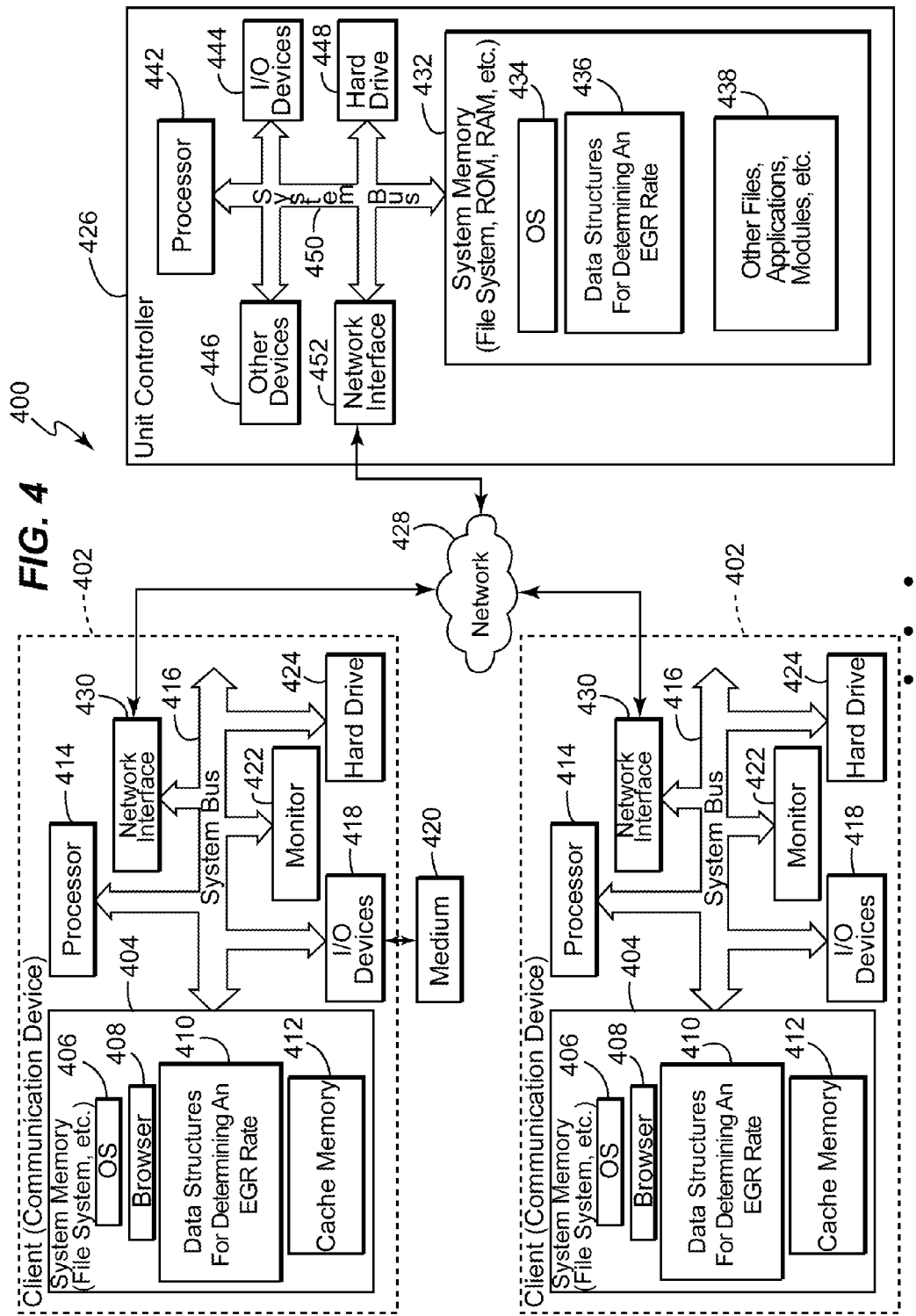
FIG. 4 is a block diagram of an exemplary system for determining a target EGR rate in accordance with an embodiment of the present invention.

FIG. 4 is a block diagram of an exemplary system 400 for determining an EGR rate in accordance with an embodiment of the present invention. The elements of the methods 200 and 300 may be embodied in and performed by the system 400. The system 400 may include one or more user or client communication devices 402 or similar systems or devices (two are illustrated in FIG. 4). Each communication device 402 may be for example, but not limited to, a computer system, a personal digital assistant, a cellular phone, or similar device capable of sending and receiving an electronic message.

The communication device 402 may include a system memory 404 or local file system. The system memory 404 may include for example, but is not limited to, a read only memory (ROM), a random access memory (RAM), a flash memory, and other storage devices. The ROM may include a basic input/output system (BIOS). The BIOS may contain basic routines that help to transfer information between elements or components of the communication device 402. The system memory 404 may contain an operating system 406 to control overall operation of the communication device 402. The system memory 404 may also include a browser 408 or web browser. The system memory 404 may also include data structures 410 or computer-executable code for determining an EGR rate that may be similar or include elements of the methods 200 and 300 in FIGS. 2 and 3 respectively.

The system memory 404 may further include a template cache memory 412, which may be used in conjunction with the methods 200 and 300 in FIGS. 2 and 3 respectively, for determining a target EGR rate.

The communication device 402 may also include a processor or processing unit 414 to control operations of the other components of the communication device 402. The operating system 406, browser 408, and data structures 410 may be operable on the processing unit 414. The processing unit 414 may be coupled to the memory system 404 and other components of the communication device 402 by a system bus 416.

The communication device 402 may also include multiple input devices (I/O), output devices or combination input/output devices 418. Each input/output device 418 may be coupled to the system bus 416 by an input/output interface (not shown in FIG. 4). The input and output devices or combination I/O devices 418 permit a user to operate and interface with the communication device 402 and to control operation of the browser 408 and data structures 410 to access, operate and control the software to determine a target EGR rate. The I/O devices 418 may include a keyboard and computer pointing device or the like to perform the operations discussed herein.

The I/O devices 418 may also include for example, but are not limited to, disk drives, optical, mechanical, magnetic, or infrared input/output devices, modems or the like. The I/O devices 418 may be used to access a storage medium 420. The medium 420 may contain, store, communicate, or transport computer-readable or computer-executable instructions or other information for use by or in connection with a system, such as the communication devices 402.

The communication device 402 may also include or be connected to other devices, such as a display or monitor 422. The monitor 422 may permit the user to interface with the communication device 402.

The communication device 402 may also include a hard drive 424. The hard drive 424 may be coupled to the system bus 416 by a hard drive interface (not shown in FIG. 4). The hard drive 424 may also form part of the local file system or system memory 404. Programs, software, and data may be transferred and exchanged between the system memory 404 and the hard drive 424 for operation of the communication device 402.

The communication device 402 may communicate with at least one unit controller 426 and may access other servers or other communication devices similar to communication device 402 via a network 428. The system bus 416 may be coupled to the network 428 by a network interface 430. The network interface 430 may be a modem, Ethernet card, router, gateway, or the like for coupling to the network 428. The coupling may be a wired or wireless connection. The network 428 may be the Internet, private network, an intranet, or the like.

The at least one unit controller 426 may also include a system memory 432 that may include a file system, ROM, RAM, and the like. The system memory 432 may include an operating system 434 similar to operating system 406 in communication devices 402. The system memory 432 may also include data structures 436 for determining a target EGR rate. The data structures 436 may include operations similar to those described with respect to the methods 200 and 300, respectively for determining a target EGR rate. The server system memory 432 may also include other files 438, applications, modules, and the like.

The at least one unit controller 426 may also include a processor 442 or a processing unit to control operation of other devices in the at least one unit controller 426. The at least one unit controller 426 may also include I/O device 444. The I/O devices 444 may be similar to I/O devices 418 of communication devices 402. The at least one unit controller 426 may further include other devices 446, such as a monitor or the like to provide an interface along with the I/O devices 444 to the at least one unit controller 426. The at least one unit controller 426 may also include a hard disk drive 448. A system bus 450 may connect the different components of the at least one unit controller 426. A network interface 452 may couple the at least one unit controller 426 to the network 428 via the system bus 450.

The flowcharts and step diagrams in the figures illustrate the architecture, functionality, and operation of possible implementations of systems, methods, and computer program products according to various embodiments of the present invention. In this regard, each step in the flowchart or step diagrams may represent a module, segment, or portion of code, which comprises one or more executable instructions for implementing the specified logical function(s). It should also be noted that, in some alternative implementations, the functions noted in the step may occur out of the order noted in the figures. For example, two steps shown in succession may, in fact, be executed substantially concurrently, or the steps may sometimes be executed in the reverse order, depending upon the functionality involved. It will also be noted that each step of the step diagrams and/or flowchart illustration, and combinations of steps in the step diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, it should be appreciated that any arrangement, which is calculated to achieve the same purpose, may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method of controlling an exhaust stream, wherein the exhaust stream is generated by a turbomachine, the method comprising:
   operating a gas turbine that comprises an inlet system; wherein the gas turbine operatively generates the exhaust stream;
   operating a heat recovery steam generator (HRSG) installed downstream of the gas turbine, wherein the exhaust stream flows from the gas turbine to an inlet portion of the HRSG;
   operating at least one exhaust gas recirculation (EGR) system comprising: at least one EGR flow conditioning device and at least one flow control device; wherein the EGR system reduces the concentration of at least one constituent within the exhaust stream; and
   operating an EGR control system for controlling a composition of the exhaust stream flowing through the EGR system, wherein steps performed by the EGR control system comprise:
      receiving an EGR control reference; and
      determining a target EGR rate, wherein the target EGR rate of the exhaust stream controls at least one component of the EGR system and configured to operatively receive information for at least one of:
         an EGR mass fraction; and
         a concentration of the at least one constituent;
   wherein the EGR control system operatively determines a composition of the exhaust stream.

2. The method of claim 1, wherein the target EGR rate sets at least one of: a speed of an EGR flow control device; a pitch of at least one EGR flow control device; a position of at least one damper or combinations thereof.

3. The method of claim 1, wherein the EGR control reference comprises at least one of an EGR mass fraction; an EGR flowrate; a concentration of the at least one constituent; an inlet fluid temperature; or combinations thereof.

4. The method of claim 1, further comprises communicating a target EGR rate to an EGR flow control device; wherein the EGR flow control device adjusts a flowrate of the exhaust stream.

5. The method of claim 4, wherein the EGR flow control device adjustment comprises at least one of: a speed of the EGR flow control device; a pitch of at least one EGR flow control device; a position of at least one damper; or combinations thereof.

6. The method of claim 5 further comprising:
determining whether an EGR flow effector control device state is within a target EGR flow control device state tolerance; and
adjusting an operation state of the EGR flow control device if the EGR flow control device state is outside of the target EGR flow control device state tolerance.

7. The method of claim 1, wherein the at least one constituent comprises at least one of $SOx$, $NOx$, $CO_2$, $CO$, $O_2$, water, chloride ions, acids, aldehydes, hydrocarbons, or combinations thereof.

8. The method of claim 1, wherein the EGR system comprises at least one EGR feedback device configured to determine the concentration of the at least one constituent within an inlet fluid.

9. A method of controlling an exhaust stream, wherein the exhaust stream is generated by a turbomachine, the method comprising:
operating a gas turbine that comprises an inlet system; wherein the gas turbine operatively generates the exhaust stream;
operating a heat recovery steam generator (HRSG) installed downstream of the gas turbine, wherein the exhaust stream flows from the gas turbine to an inlet portion of the HRSG;
operating at least one exhaust gas recirculation (EGR) system comprising: at least one EGR flow conditioning device and at least one flow control device; wherein the EGR system processes the exhaust stream; and
operating an EGR control system for controlling a composition of the exhaust stream flowing through the EGR system, wherein steps performed by the EGR control system comprise:
receiving an EGR control reference; and
determining a target EGR rate, wherein the target EGR rate of the exhaust stream controls at least one component of the EGR system and configured to operatively receive information for at least one of:
an EGR mass fraction; and
a concentration of at least one constituent;
communicating the target EGR rate to an EGR flow control device, wherein the EGR flow control device adjusts the flow of the exhaust stream;
wherein the EGR control system operatively determines a composition of the exhaust stream.

10. The method of claim 9, wherein the target EGR rate sets at least one of a speed of the EGR flow control device; a pitch of at least one EGR flow control device; a position of at least one damper; or combinations thereof.

11. The method of claim 9, wherein the EGR control reference comprises at least one of an EGR mass fraction, an EGR mole fraction, an EGR flowrate, a concentration of the at least one constituent, an inlet fluid temperature, or combinations thereof.

12. The method of claim 9, wherein the EGR flow control device adjusts at least one of a speed of the EGR flow conditioning device; a pitch of at least one EGR flow control device; a position of at least one damper; or combinations thereof.

13. The method of claim 12 further comprising:
determining whether an EGR flow control device state is within a target EGR flow control device state tolerance; and
adjusting the operation of an EGR flow control device state is the EGR flow control device state is outside of the target EGR flow control device state tolerance.

14. The method of claim 9,
wherein the EGR system comprises at least one EGR feedback device configured to determine the concentration of the at least one constituent within an inlet fluid.

* * * * *